US007685916B2

(12) United States Patent
Mathues et al.

(10) Patent No.: US 7,685,916 B2
(45) Date of Patent: Mar. 30, 2010

(54) PRODUCT CLAMP FOR FOOD SLICING MACHINE

(75) Inventors: Thomas P. Mathues, Hilliard, OH (US); William J. Locascio, Lancaster, OH (US)

(73) Assignee: J. E. Grote Company, Inc., Columbus, OH (US)

( * ) Notice: Subject to any disclaimer, the term of this patent is extended or adjusted under 35 U.S.C. 154(b) by 501 days.

(21) Appl. No.: 11/517,844

(22) Filed: Sep. 8, 2006

(65) Prior Publication Data

US 2008/0060494 A1 Mar. 13, 2008

(51) Int. Cl.

| | |
|---|---|
| ***B26D 11/00*** | (2006.01) |
| ***B26D 7/06*** | (2006.01) |
| ***B26D 5/20*** | (2006.01) |
| ***B27B 5/18*** | (2006.01) |
| ***B23D 19/00*** | (2006.01) |
| ***B23D 45/00*** | (2006.01) |

(52) U.S. Cl. ............................. 83/865; 83/703; 83/409; 83/257; 83/262; 83/282

(58) Field of Classification Search ........... 83/703–711, 83/713–725, 727–731, 409–409.2, 225, 230, 83/257, 262, 282, 453

See application file for complete search history.

(56) References Cited

U.S. PATENT DOCUMENTS 165,963 A * 7/1875 Stewart ....................... 83/282
1,452,724 A * 4/1923 Blanco ........................ 83/720
1,801,250 A * 4/1931 Stukart ........................ 83/409
2,007,219 A * 7/1935 Singer ......................... 83/263
3,667,522 A * 6/1972 Bingham ..................... 83/155
3,760,715 A 9/1973 Grote et al.
3,797,353 A * 3/1974 Calhan ........................ 83/718
4,050,339 A * 9/1977 Soleri .......................... 83/703
4,436,012 A * 3/1984 Hochanadel ................. 83/703
4,543,864 A * 10/1985 Hochanadel et al. ........... 83/91
4,548,107 A * 10/1985 Marchese et al. .............. 83/23
6,044,739 A * 4/2000 Abler et al. .................... 83/88
6,543,325 B1 * 4/2003 Newhouse et al. ............ 83/703
7,263,923 B2 * 9/2007 Urschel et al. ................ 83/444

FOREIGN PATENT DOCUMENTS

SU 905067 2/1982

* cited by examiner

*Primary Examiner*—Ghassem Alie
*Assistant Examiner*—Bharat C Patel
(74) *Attorney, Agent, or Firm*—Jason H. Foster; Kremblas Foster Intellectual Property

(57) ABSTRACT

A clamping mechanism for a food slicing machine having a product holder that is driven cyclically through a food slicing blade along an arcuate or linear path. The clamping mechanism is driven by the drive means that drives the product holder, thereby assuring the timing of the clamping during the cutting portion of the stroke. A drive rod extends from the drive means, which can be a driveshaft, and extends to a plate that is pivotably mounted to the product holder. The plate pushes plungers through the sidewall of the holder to seat against and clamp the food product against the sidewall of the holder.

5 Claims, 12 Drawing Sheets

PRODUCT CLAMP FOR FOOD SLICING MACHINE

BACKGROUND OF THE INVENTION

1. Field of the Invention

This invention relates generally to a food product slicing machine, and more particularly to an apparatus for cyclically clamping and releasing a food product in a moving product holder.

2. Description of the Related Art

Conventional food product slicing machines, such as the machine disclosed in U.S. Pat. No. 3,760,715 to Grote et al. (which is incorporated herein by reference), reciprocatingly displace food logs along a path through a slicing blade for removing thin slices of the food product during each stroke. Whereas the Grote et al. patent teaches to displace food products through a linear path, other food slicing machines displace food products through an arcuate path. Such a machine is shown in U.S. Pat. No. 4,436,012 to Hochanadel, which is also incorporated herein by reference. In the Hochanadel machine, a food product holder is reciprocatingly pivoted about an axle to swing a food product held therein through a path that includes a blade.

In both types of machines, the food product, often in the shape of an elongated log, is placed in a cylindrical food product holder barrel. The cylindrical barrel is a constant cross section, and can be a circular, rectangular or any other cross section cylinder. The food log is typically dropped into the end of the barrel, which is larger than the largest food log that will be placed therein, in order to accommodate any such log. The barrel can be circular, rectangular or virtually any shape, but is elongated to accommodate the elongated shape of the food log. The food product is fed by gravity downwardly through the holder toward the lower end of the product holder, where the product holder intersects the blade. The lower end of the food product slides along a first curved plate and a second curved plate that is offset slightly above the first plate. The blade is positioned at the edge of the second plate and is offset the same as the second plate. When the food log is slid along the first plate, it encounters the blade, which removes a slice that is a thickness approximately equal to the offset. Then the newly formed end of the log rests upon the second plate until the product holder, during the backswing portion of the holder's stroke, passes the blade and drops down onto the first plate under the influence of gravity. During the cutting portion of the stroke, the log is sliced again.

It is common for there to be small inconsistencies in food slices due to the movement of the food log in the product holder during cutting. For example, a food log that is half as wide as the product holder can move relative to the product holder its entire width during half of each stroke of the product holder. This movement is undesirable due to the variations in slices that result. Alternatively, if the product holder is the same width of the food log, two problems arise. First, variations in food log dimensions will cause some logs to fit correctly and others to fit incorrectly within the barrel. Second, if there is no space between the food log and the product holder sidewall, loading of the food log will be difficult due to the lack of any tolerance for misalignment of the log with the barrel of the holder, and friction between the food log and the walls of the barrel may prevent the food log from feeding properly due to the force of gravity.

Therefore, the need exists for an apparatus that maintains the food log in position during slicing, permits the food log to fall under the influence of gravity when necessary, and is easily loaded.

BRIEF SUMMARY OF THE INVENTION

The invention is a product clamping apparatus for a slicing machine having at least one holder with a sidewall defining an elongated, product-receiving barrel. The holder is cyclically driven by drive means, preferably a rotatable driveshaft, to displace a product in the holder through a slicing blade during a portion of the holder's stroke. The clamping apparatus includes a drive rod having a driveshaft end and a plunger end. The driveshaft end of the drive rod is drivingly linked to the driveshaft at a position radially offset from the driveshaft's axis of rotation. This is in the manner of a crank shaft for reciprocatingly driving the drive rod.

At least one plunger is drivingly linked to the plunger end of the drive rod, and preferably the plunger is drivingly linked to a plate that is pivotably mounted to the holder at a hinge. The plunger has a product end that extends through an aperture formed in the holder for seating against the product and clamping the product against the holder sidewall during the slicing portion of the holder's stroke.

In a preferred embodiment, the plate is pivotably mounted to the plunger end of the drive rod at a position radially offset from the hinge for being driven by the drive rod about the hinge. Furthermore, a second plunger is drivingly linked to the plate above the first plunger for clamping the product against the holder sidewall at a position longitudinally spaced from the first plunger. This reduces or prevents movement of the food product about the first plunger. In a most preferred embodiment, a first spring is mounted between the plate and the first plunger and a second spring is mounted between the plate and the second plunger. A force is applied to the springs by the plate, and the springs can be compressed if the plungers resist the force applied by the plate through the springs. This avoids damage to the food product while still applying a force to hold the food product in place.

In the invention, the food product in the holder is clamped against the sidewall of the holder during the slicing portion of the holder's stroke, and during another portion of the stroke the food product is released to fall toward the blade end of the holder under the influence of gravity. This provides consistent slices, and does not restrict the gravity feeding of the food product.

Figure 1:
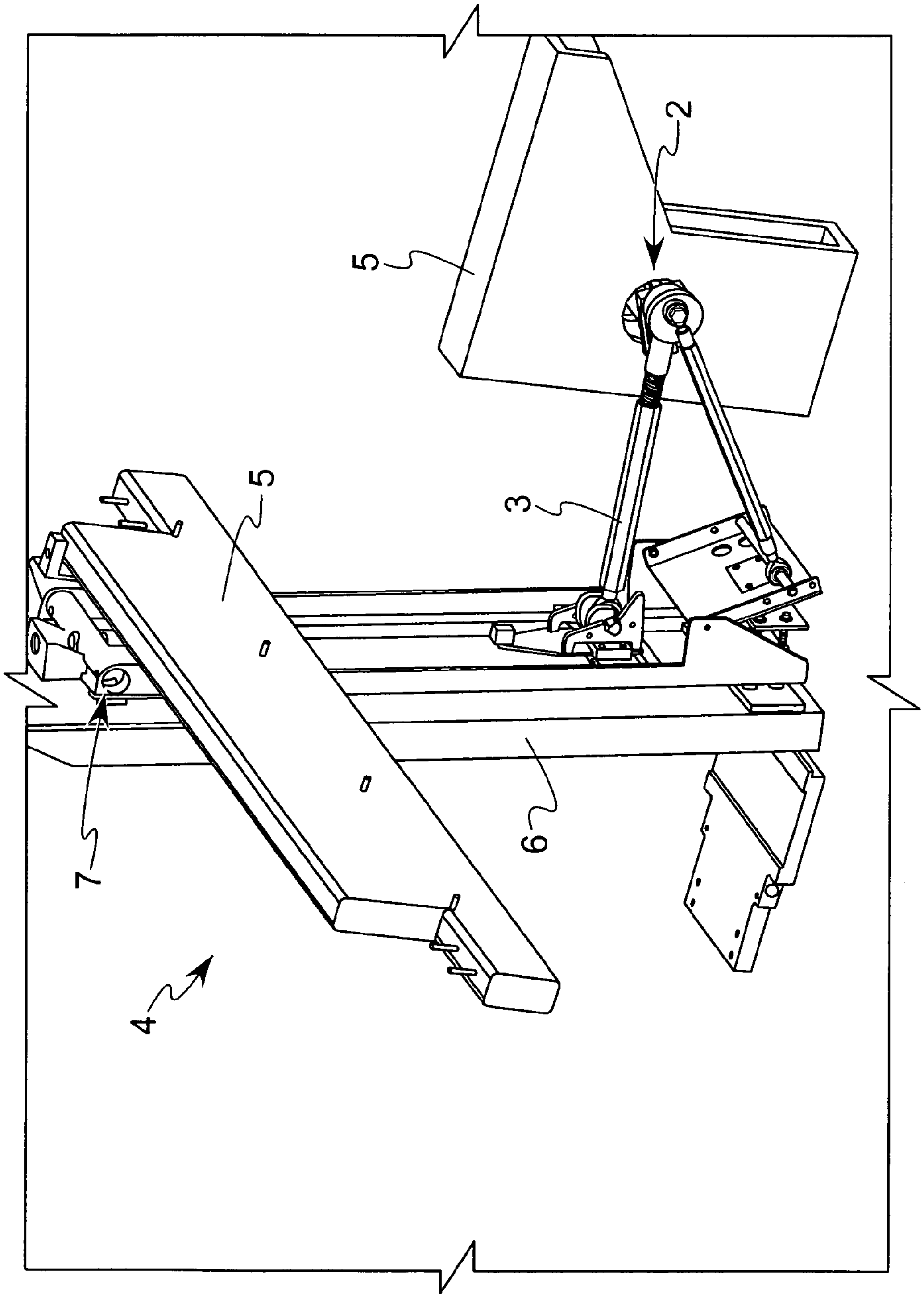
FIG. 1 is a view in perspective illustrating the invention in an operable position on a conventional food slicing machine.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 14:
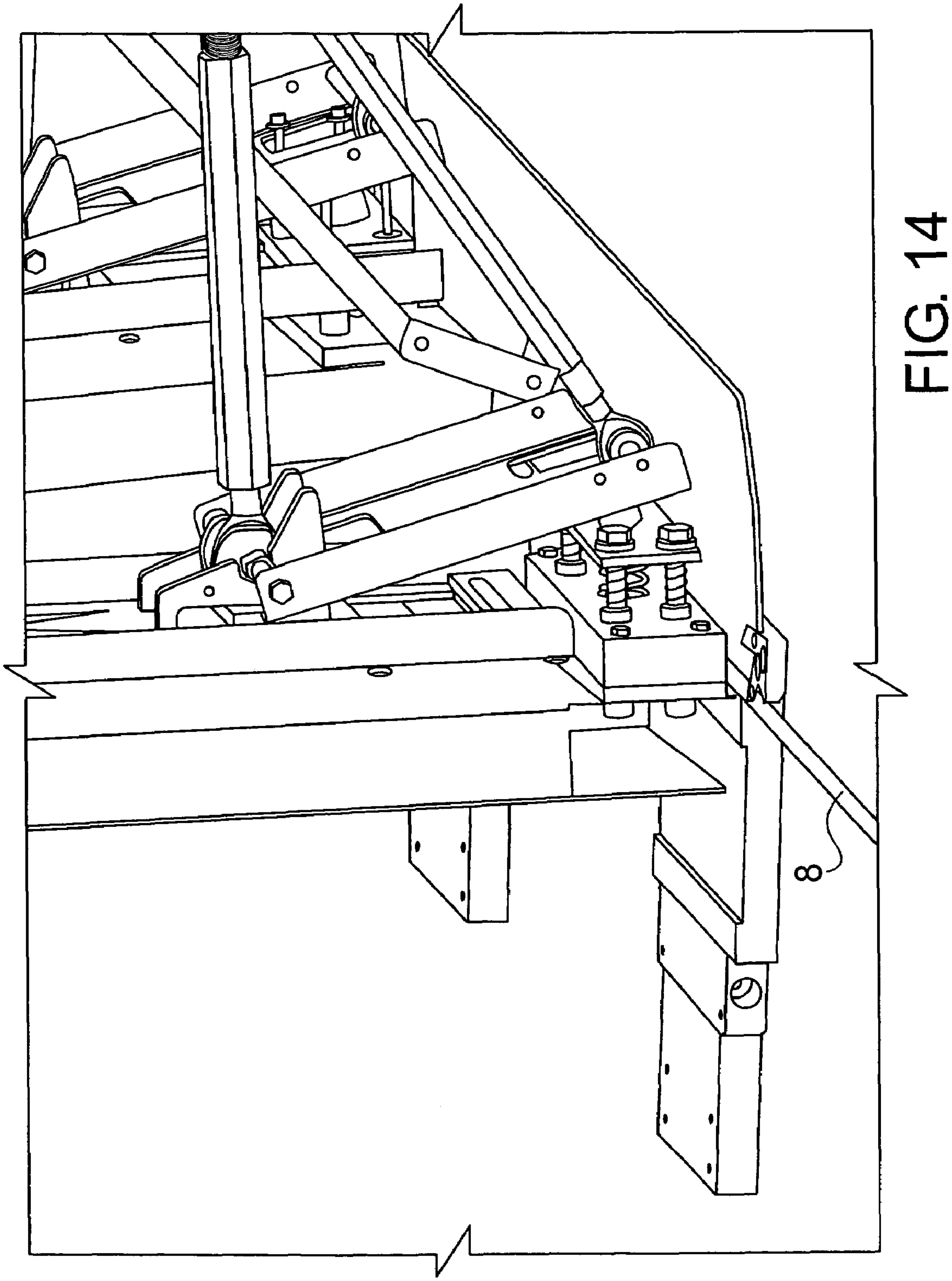
FIG. 14 is a view in perspective illustrating the invention in an operable position on a conventional food slicing machine.

The present invention is illustrated in FIG. 1 on a conventional food slicing machine 4. The machine 4 has a frame 5, which is made up of a plurality of members, only a few of which are illustrated, mounted together and resting upon a work surface, typically a food processing plant floor. Other parts of the machine 4 mount to the frame 5, and are supported by the frame 5. For example, a product holder 6 is pivotably mounted to the frame 5 at a pivot 7, and pivots its lower end through a path adjacent the blade 8 (see FIG. 14). The blade 8 is preferably a conventional band blade that is driven rapidly through a blade guide by a pulley system as described in the patents incorporated by reference herein.

The product holder 6 is reciprocatingly driven about the pivot 7 by a driveshaft 2 that rotates at a desired slicing speed, which can be low or high speed, about an axis of rotation that is coaxial with the axis of the shaft 2. The connecting rod 3 has a rotary connection to the driveshaft 2 at one end permitting the driveshaft 2 to rotate relative to the connecting rod 3. The connecting rod 3 is mounted with the axis of its rotary connection at the driveshaft end radially offset from the axis of rotation of the driveshaft 2, thereby resulting in a crank arm connection between the driveshaft 2 and the connecting rod 3. The amount of offset can be adjusted, as is conventional. Upon rotation of the driveshaft 2, the axis of the rotary connection of the connecting rod 3 revolves around the axis of the driveshaft 2, in the manner of a crankshaft, thereby imparting reciprocating longitudinal motion to the connecting rod 3.

The opposite end of the connecting rod 3 is pivotably mounted to the product holder 6. When the driveshaft is rotated, thereby moving the connecting rod 3 longitudinally, the product holder 6 is reciprocated about its pivot 7. When the driveshaft 2 rotates through an entire revolution, the product holder 6 is driven in one direction from a starting position, through the blade 8, and is then driven to the starting position to complete an entire stroke and begin the next stroke upon further rotation of the driveshaft. By driving the driveshaft 2 rapidly, the product holder 6 is driven cyclically through its stroke with its lower end passing above the slicing blade 8 two times in every stroke. The product holder 6 shown is driven along an arcuate path, but the invention can be used with a product holder driven along a linear path.

Figure 2:
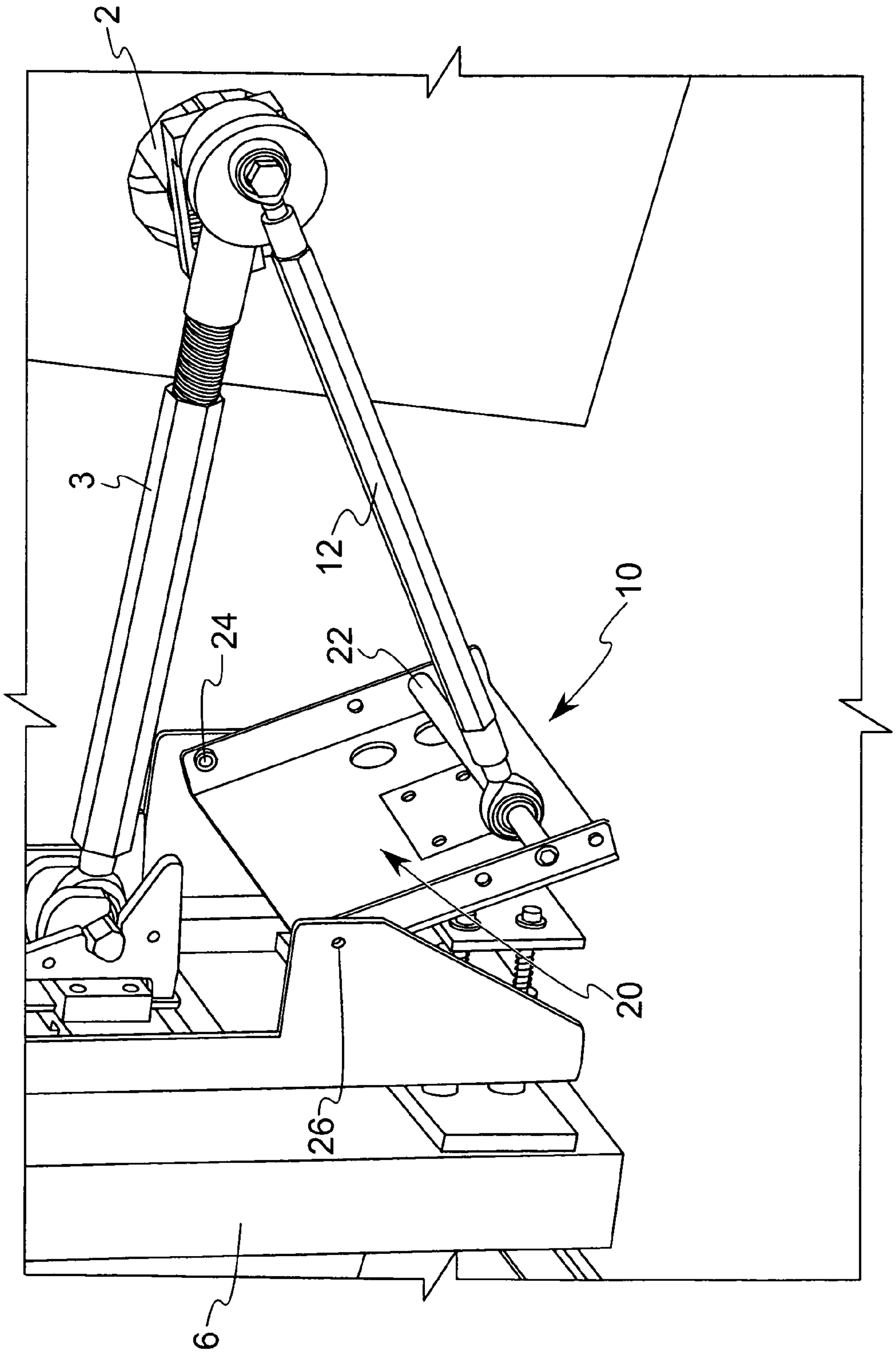
FIG. 2 is an enlarged view in perspective illustrating the machine of FIG. 1.

As shown in FIG. 2, the clamping apparatus 10 is mounted to the driveshaft 2 and the product holder 6 to cooperate with the driveshaft 2 and the product holder 6. The clamping apparatus 10, it will become apparent, can be drivingly linked to virtually any drive means used to drive the product holder 6. Thus, if the product holder 6 is driven, for example, by a linear motor, it will become apparent to the person of ordinary skill how the clamping apparatus 10 can be modified to adapt to this different drive means. Furthermore, the clamping apparatus can be driven by its own, separate drive mechanism, although this adds to the expense and complexity of the machine.

In the preferred clamping apparatus 10, the plate 20 is mounted to the holder 6 using hinge pins 24 and 26 extending through the plate and into the holder 6 or a structure that is mounted to the holder 6, as shown. The plate 20 pivots without substantial resistance when driven about an axis that extends through the centers of the pins 24 and 26. In an alternative embodiment, shown in FIG. 6, the pin 104 that the connecting rod 103 pivots around, is the same pivot point for the alternative plate 120.

Figure 8:
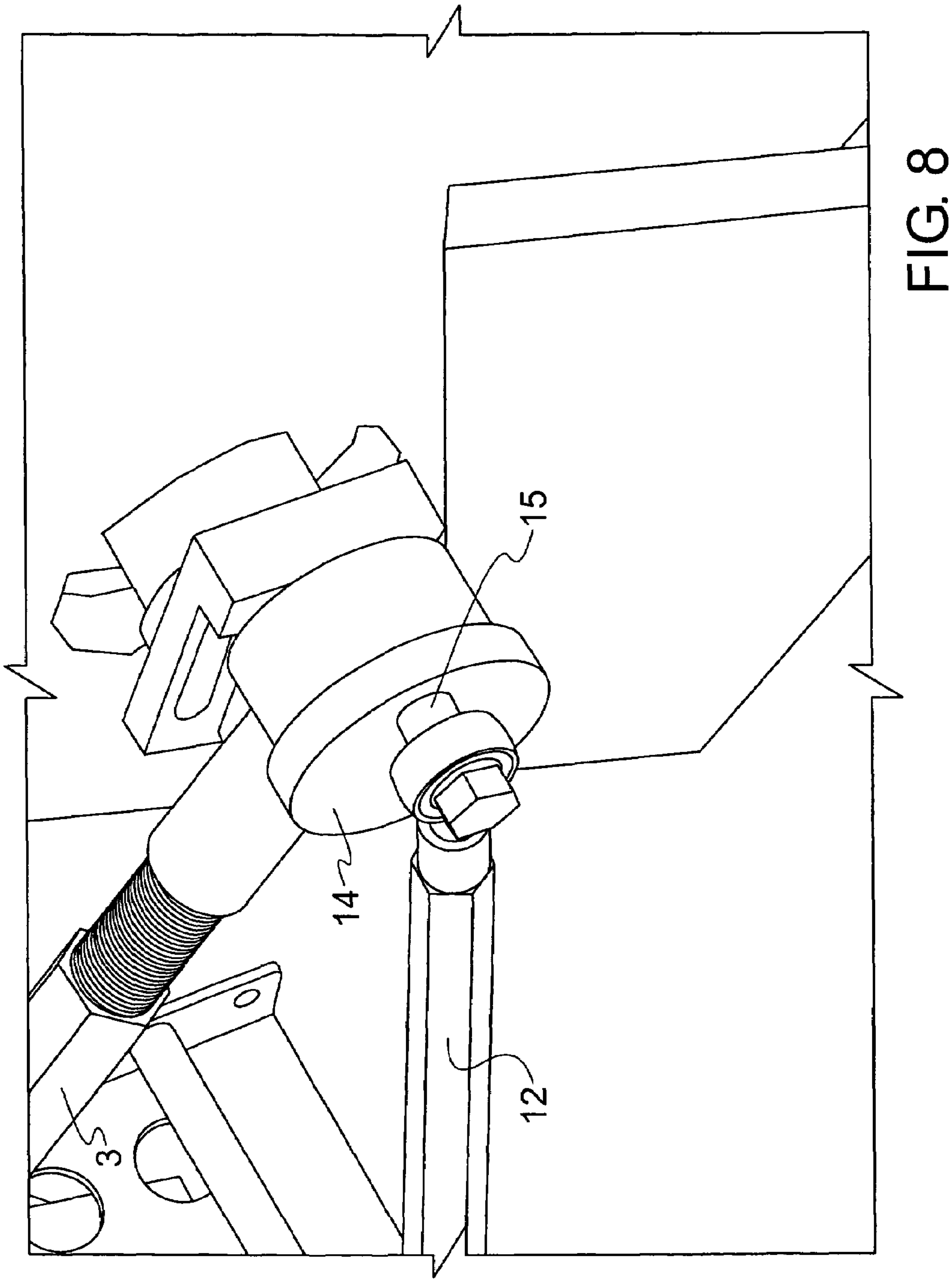
FIG. 8 is a view in perspective illustrating the drive means of the embodiment of FIG. 1.
Figure 9:
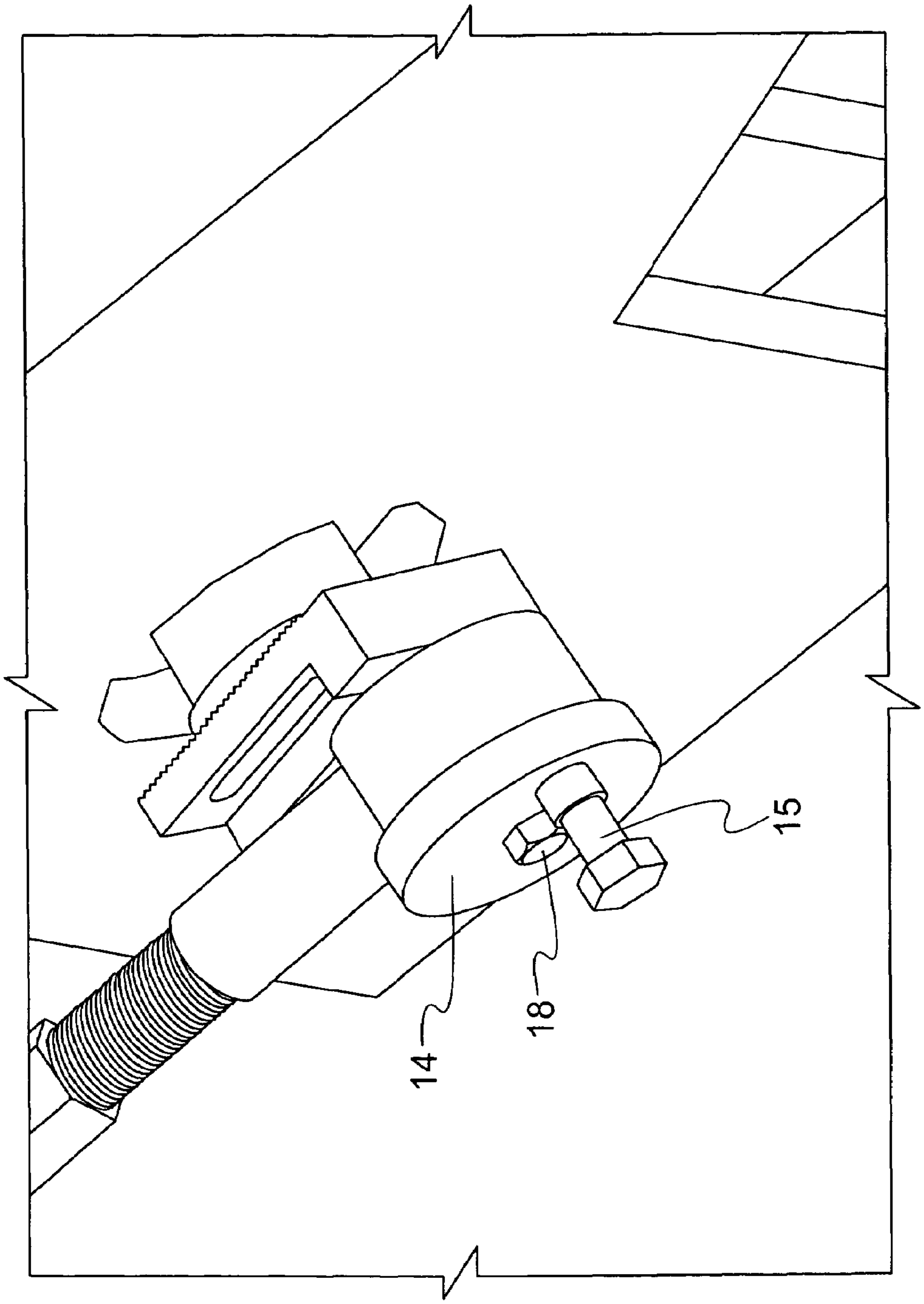
FIG. 9 is a view in perspective illustrating the drive means of FIG. 8 with some structures removed for visibility of the underlying structures.

As shown in FIGS. 8 and 9, the drive rod 12 is rotatably mounted at one end to a pin 15 extending into the disk 14 that is mounted to the driveshaft 2 by the bolt 18. The drive rod 12 is mounted with its axis of rotation, which is coaxial with the pin 15, offset from the axis of rotation of the driveshaft 2, thereby resulting in a crankshaft-like connection to the drive rod 12. The axis of rotation of the drive rod 12 may be offset from the axis of rotation of the end of the connecting rod 3 at the driveshaft 2, and this offset position can be modified to adjust the timing of the relative movement of the connecting rod 3 and the drive rod 12. This adjustment can be accomplished by replacing the disk 14 with a modified disk, loosening and then reattaching the disk 14 with the pin 15 at a different radial position on the disk 14, or by other means that will become apparent to the person having ordinary skill.

Figure 4:
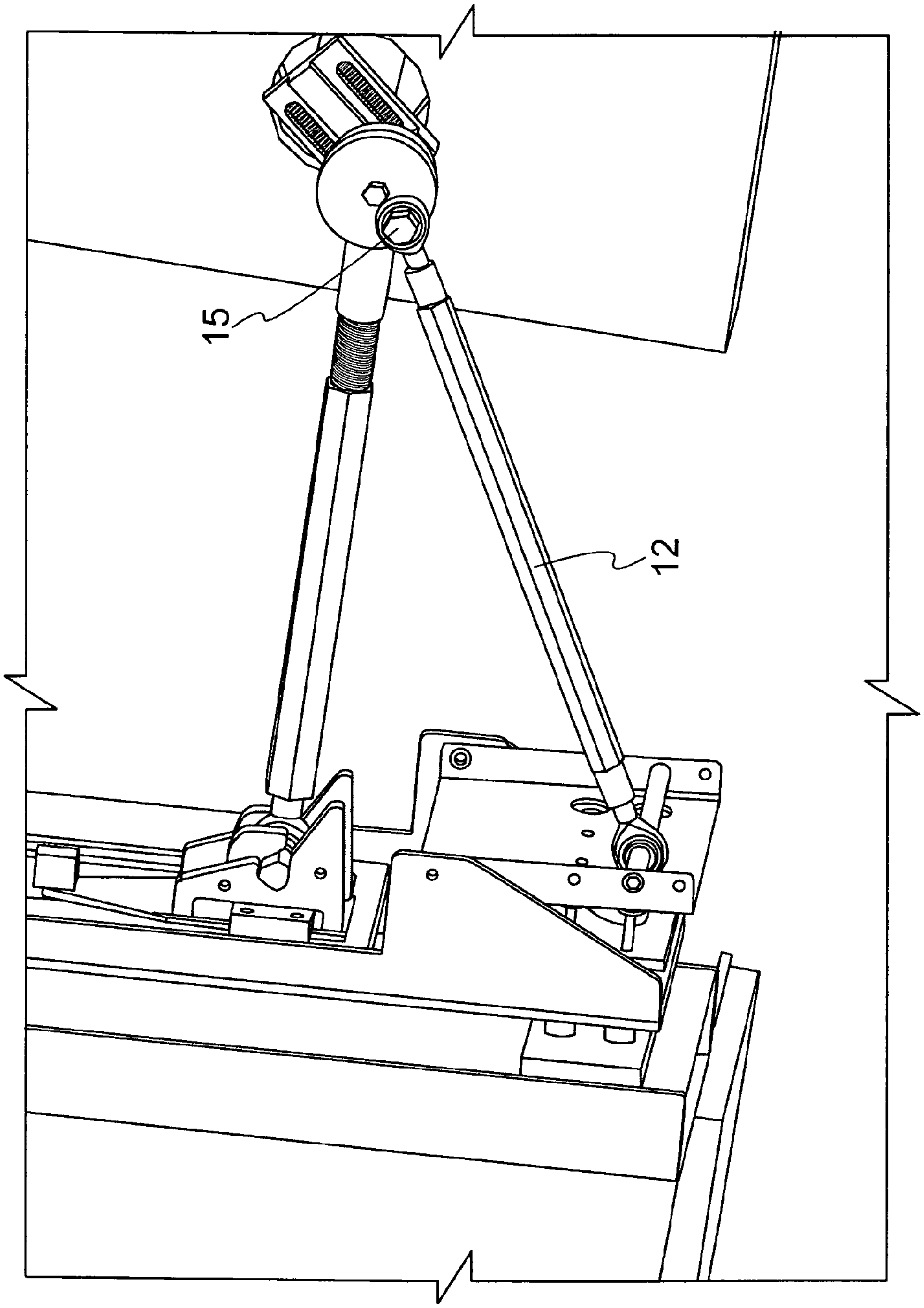
FIG. 4 is an enlarged view in perspective illustrating the machine of FIG. 1 with the plungers extended into the barrel of the product holder.

The end of the drive rod 12 opposite the driveshaft 2 mounts to the pin 22 rigidly mounted to the plate 20. Collars (shown in FIGS. 6 and 7) are mounted on the pin 22 on opposite sides of the drive rod end to maintain the position of the drive rod end along the pin 22. The drive rod 12 can pivot about the pin 22, and preferably the drive rod ends are spherical joints. Therefore, as the drive rod 12 moves longitudinally and vertically (in the orientation of FIG. 2) relative to the plate 20 about the pin 22, there is no substantial resistance to this movement. Thus, as the drive rod 12 is driven by the driveshaft 2, which occurs simultaneously with the connecting rod being driven by the driveshaft 2, the plate 20 is pivoted through its stroke relative to the holder 6, even as the holder 6 pivots through its own stroke. The drive rod 12 is shown in a different position of the stroke in FIG. 4 as compared to FIG. 2. It will become apparent to the person of ordinary skill that the drive rod 12, connecting rod, disk 14, product holder 6, plate 20 and other structures form a Stephenson (I) Sixbar Linkage.

Figure 3:
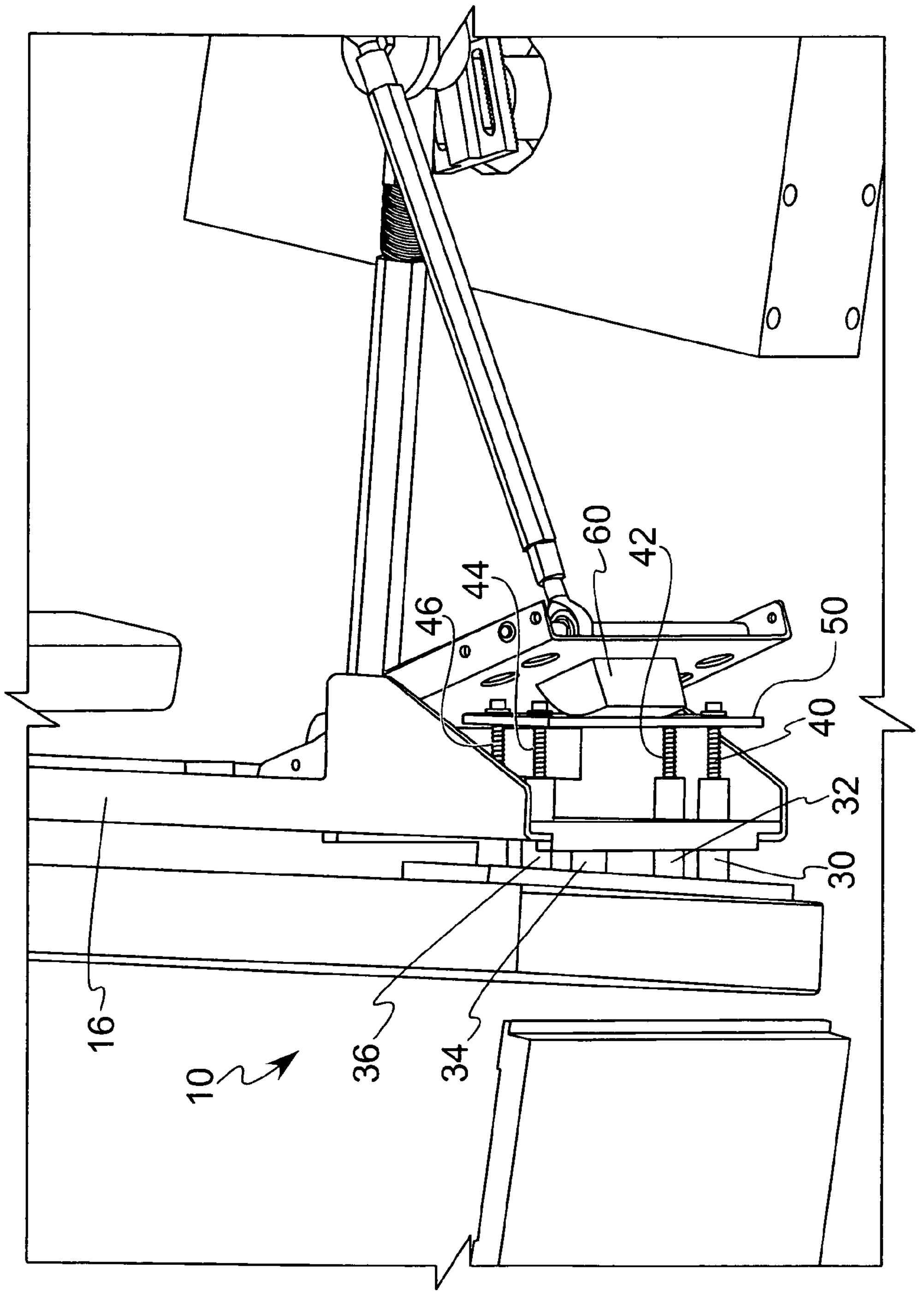
FIG. 3 is a an enlarged view in perspective illustrating the machine of FIG. 1 viewed from the underside.

As best shown in FIG. 3, there is at least one, and there are preferably four, plungers 30, 32, 34 and 36 extending from a driving link with the plate 20 to the holder 6. Each link is preferably a spring that seats at one end against the end of the plunger, and at the opposite end against the back of the bracket 50. The springs are preferably the coil springs 40, 42, 44 and 46 that encircle rods that extend from rigid connection to the plungers 30, 32, 34 and 36, respectively. Alternatively, the springs can be any type of spring, including, but not limited to, gas, magnetic (permanent or electromagnetic), elastomeric, controlled solenoid, or any other structure that can be compressed to store potential energy, and expanded to release the potential energy. It is contemplated that the spring can be a portion of a plunger, such as a plunger rod, that is made of a compressible, compliant material, such as rubber or another elastomer. Each plunger is preferably a circular cylindrical piston.

The rods that extend from rigid connection to the plungers extend slidably through the aligned apertures in the bracket 50, and have enlarged proximal ends, which can be formed by attaching conventional threaded nuts thereto. The rods can be extended through the apertures in the direction that compresses the springs 40-46, but the nuts prevent extension of the ends of the rods beyond the nuts in the opposite direction. The lengths of the rods are designed so that the springs in their unstroked state are slightly compressed, thereby imparting a calibrated preload to the food product before beginning the cyclical compression to allow for various sizes of product.

Each of the plungers 30-36 extends at its distal end through a pair of aligned apertures formed in a sidewall 6*a* (FIG. 5) of the product holder 6 and the plate 16 rigidly mounted to the holder 6. These aligned apertures prevent substantial lateral movement of the plungers, and permit substantially unrestricted longitudinal movement of the plungers. The distal ends of the plungers 30-36 extend into the elongated, barrel-like passage of the holder 6 to seat against any food products, such as cheese or meat logs 31, that occupy the barrel of the holder 6. The distal ends are preferably dome-shaped or chamfered around their peripheral edge, and it is preferred that at least one of the plungers is positioned above (in the operable orientation) another of the plungers so that two plungers contact the food product at two different points along the food product's length. This prevents or at least reduces "rocking" of the food product about the end of one of the plungers.

Figure 5:
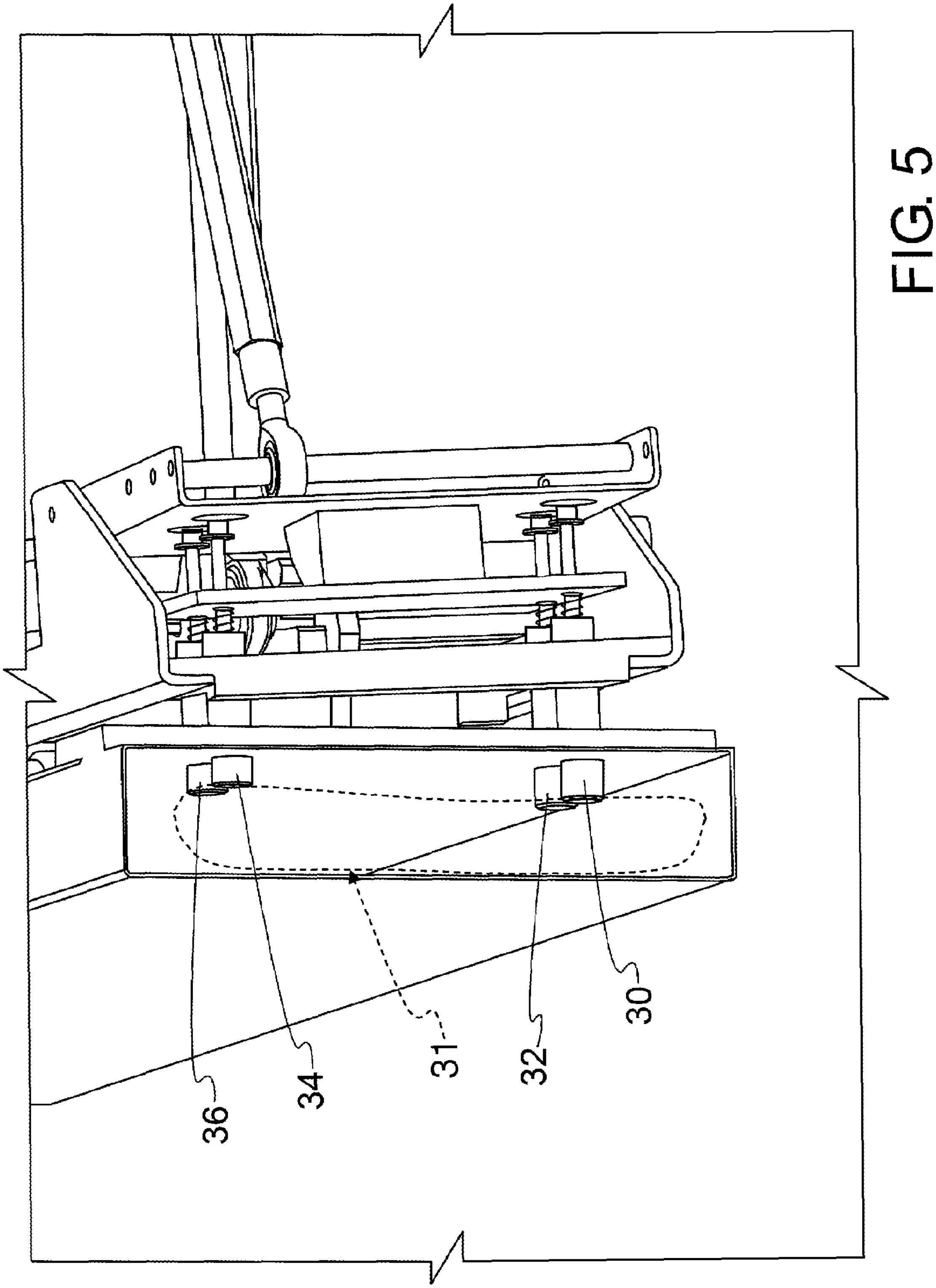
FIG. 5 is an enlarged view in perspective illustrating the machine of FIG. 4 viewed from the underside.

The pushing block 60 is rigidly mounted to the plate 20, and seats against the bracket 50 at its arcuately shaped surface. When the plate 20 is driven toward the holder 6 by the drive rod 12, the pushing block 60 applies a force to the bracket 50, which transfers the force to the springs 40-46. Thus, when the bracket 50 is displaced toward the holder 6, the bracket 50 applies a compressing force to the springs 40-46, and the springs apply the force to the plungers 30-36, urging the plungers toward and into the barrel of the holder 6 as shown in FIG. 5. FIG. 5 shows the plungers 30-36 near an extreme position in the holder 6, when the drive rod 12 is in the position shown in FIG. 5, which is at or near the distal extreme of its stroke.

As the plungers are displaced into the holder 6, the distal ends of the plungers opposite the bracket 50 seat against any food product in the barrel of the holder 6. When the plunger ends seat against the food product and the plate 50 is pushed further, the springs compress to prevent the plungers from compressing the food product to the point of damaging it. The springs are designed with a spring rate that causes the springs to compress until the force required to compress the springs further exceeds the resistance to further plunging movement into the barrel caused by the obstructing food product. The resistance to further plunging movement is commonly the resistance of the food log to being pushed against the opposite sidewall 6*b* (FIG. 5) of the holder 6. However, when the resistance to plunger movement is exceeded by the force applied to the plungers by the bracket 50 through the springs, the plungers plunge into the barrel and slide the food product across the barrel of the holder 6 until the food log seats against the opposite sidewall of the holder 6. The plungers then hold the food product from sliding in the elongated barrel of the holder 6 during the entire slicing portion of the stroke. It is preferred that the force required to compress the springs never exceed the force necessary to damage the food product.

Because the force on the bracket 50 is applied to the plungers 30-36 through compressible springs, the bracket 50 can be displaced the same distance in every stroke without damaging the food product, despite variations in food product width. Resistance to plunger movement due to the presence of a wider food product can be accommodated by further compression of the springs. The amount of force required to compress the springs 40-46 can be varied by replacing the springs with different springs. By selecting springs of a desired spring rate, and selecting the preload on the springs, the amount of force applied to the food product by the apparatus 10 can be varied from time to time.

The food product is preferably clamped against the sidewall of the holder 6 from just before the slicing begins until just after slicing is completed. That way, no longitudinal movement of the food product is permitted during the portion of the holder stroke during which slicing occurs. Conversely, longitudinal movement of the food product is permitted during the portion of the holder stroke when the food product, such as a food log, must fall under the influence of gravity in order to be positioned for the next slice to occur.

It is important to note that the cyclical clamping and unclamping of the food product in the holder is driven by the same driveshaft 2 that drives the product holder 6, thereby assuring that the timing of the clamp's movement is consistent with the timing of the product holder's movement. This makes it certain that if the reciprocating speed of the product holder is modified, such as by modifying the rotational speed of the driveshaft 2, the reciprocating speed of the clamp is automatically modified to match.

The timing of the clamping and unclamping of the food product is controlled by the relative positions of the rotary axis of the drive rod end, which is coaxial with the pin 15, and the rotary axis of the connecting rod 3. This timing can be varied by changing the circumferential position of the pin 15 on the driveshaft 2, such as by loosening the pin 18, rotating the disk 14 relative to the connecting rod 3 and tightening the pin 18.

The length of the stroke of the plate 20 can be varied by changing the radial position of the pin 15 relative to the axis of rotation of the driveshaft 2. The length of the rod 12 can be varied by moving its externally threaded core relative to its internally threaded annular shell in the manner of a turnbuckle. The relative angle between the connecting rod 3 and the drive rod 12 can be changed, to further alter the relative timing of the two drives, by moving the rod end on the drive plate.

By pushing the food product against the sidewall of the holder 6 opposite the plungers, the location of the last edge of the food product to pass through the slicer can be determined. This is because that sidewall of the holder 6 always passes through the blade last in the slicing portion of the stroke. By aligning the food product against that sidewall, the precise moment when the food product can begin to fall under the influence of gravity is consistent, regardless of the width of the food product. Thus, the moment in each stroke when the food product can be released by the plungers can be established, and is consistent with every stroke.

Figure 6:
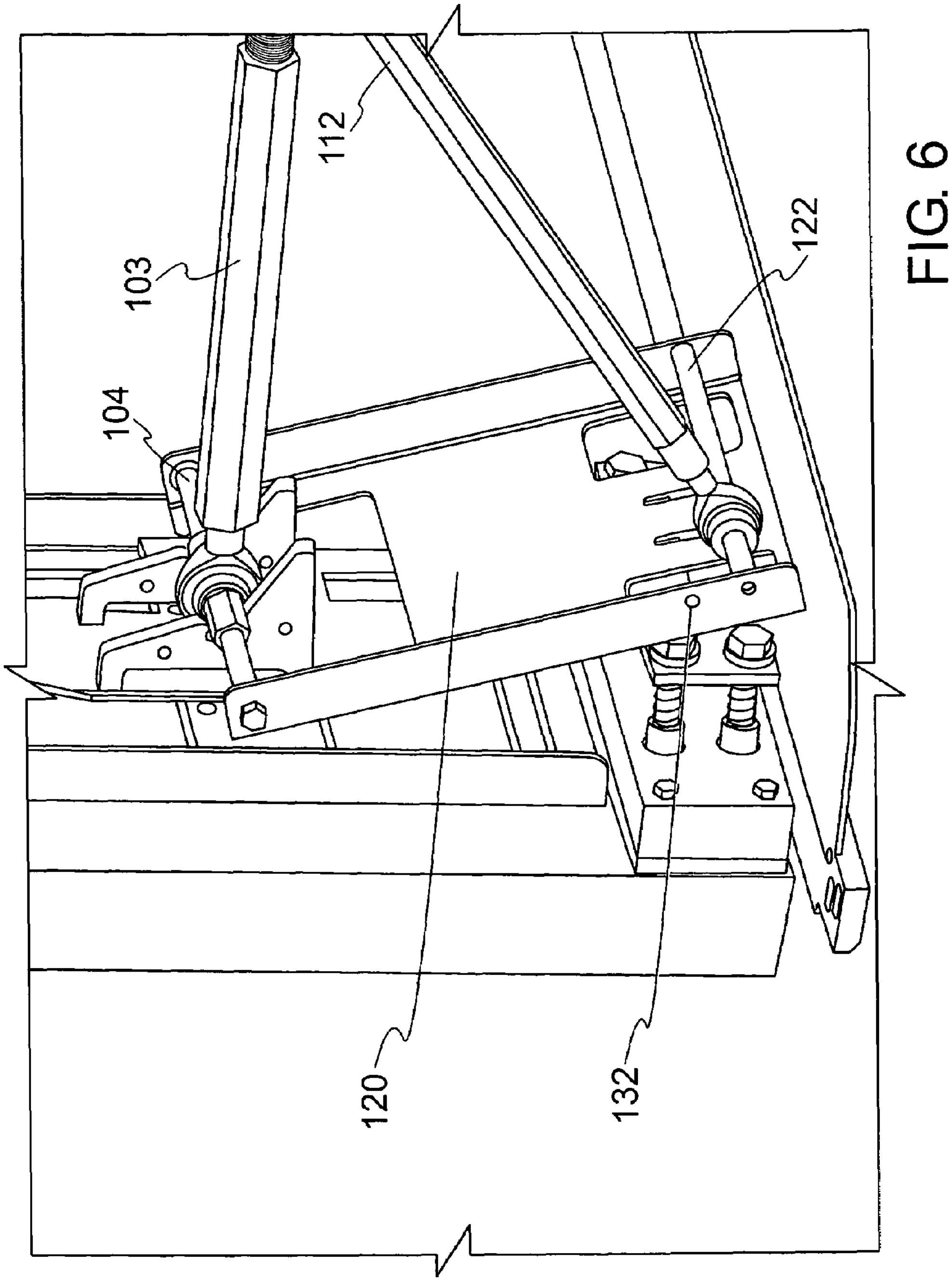
FIG. 6 is a view in perspective illustrating an alternative embodiment of the present invention.
Figure 7:
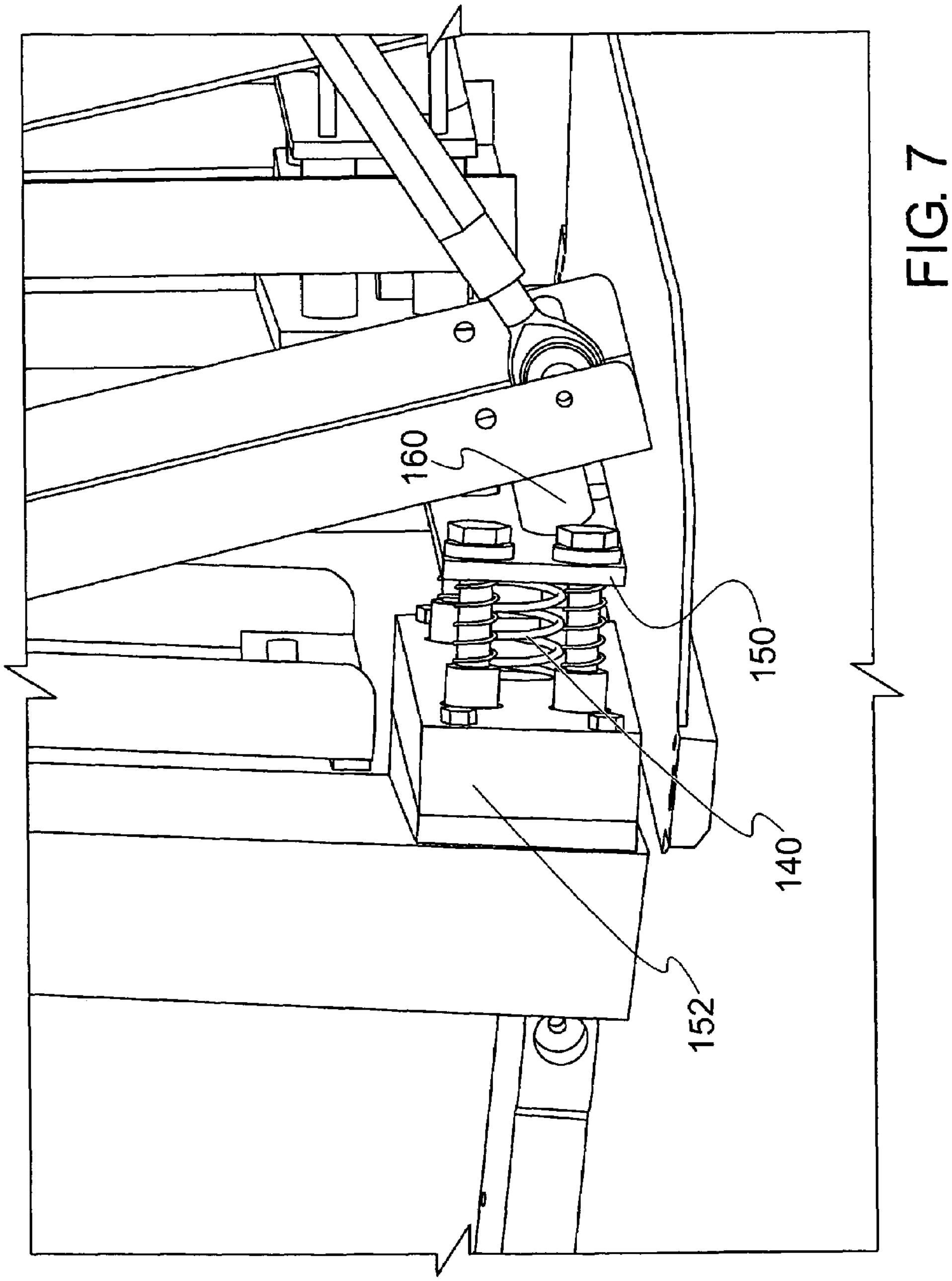
FIG. 7 is a view in perspective illustrating a magnified view of the FIG. 6 embodiment.

An alternative embodiment of the present invention is shown in FIGS. 6 and 7, in which the plate 120 attaches at its upper end to the axle 104 that is coaxial with the axis of rotation of the connecting rod 3 at the holder 6 end. The position of the drive rod 112 relative to the plate 120 can, as in the embodiment shown in FIGS. 1-5, be changed by moving the pin 122 into another set of holes, such as the hole 132 and the hole on the opposite side of the plate 120 (not shown). This varies the stroke length of the plate 120. The embodiment of FIG. 7 also makes apparent where the spring 140 is positioned that causes the plate 120 to return and seat against the pusher block 160. The spring 140 seats at one end against the block 152 and the opposite end against the bracket 150. Thus, when the pusher block 160 pushes the bracket 150, thereby urging the plungers toward the holder 6, the spring 140 is compressed. When the force of the pusher block 160 is released from the bracket 150, the spring 140 unloads, thereby forcing the bracket 150 away from the holder 6. This arrangement facilitates separation of the drive mechanism from the driven mechanism, the latter of which remains with the product holder. This is important when performing some cleaning and maintenance functions that are desired for this type of machine.

In another alternative embodiment, a mechanism is attached to the product holder that is driven by the same driveshaft that drives the connecting rod in order to drive food products in the product holder toward the slicing blade during a portion of the reciprocating cycle of the product holder. This mechanism 202 is illustrated in FIGS. 10-13 in one example, but it will be understood that many other mechanisms can be devised by the person of ordinary skill based on the principals discussed herein.

Figure 10:
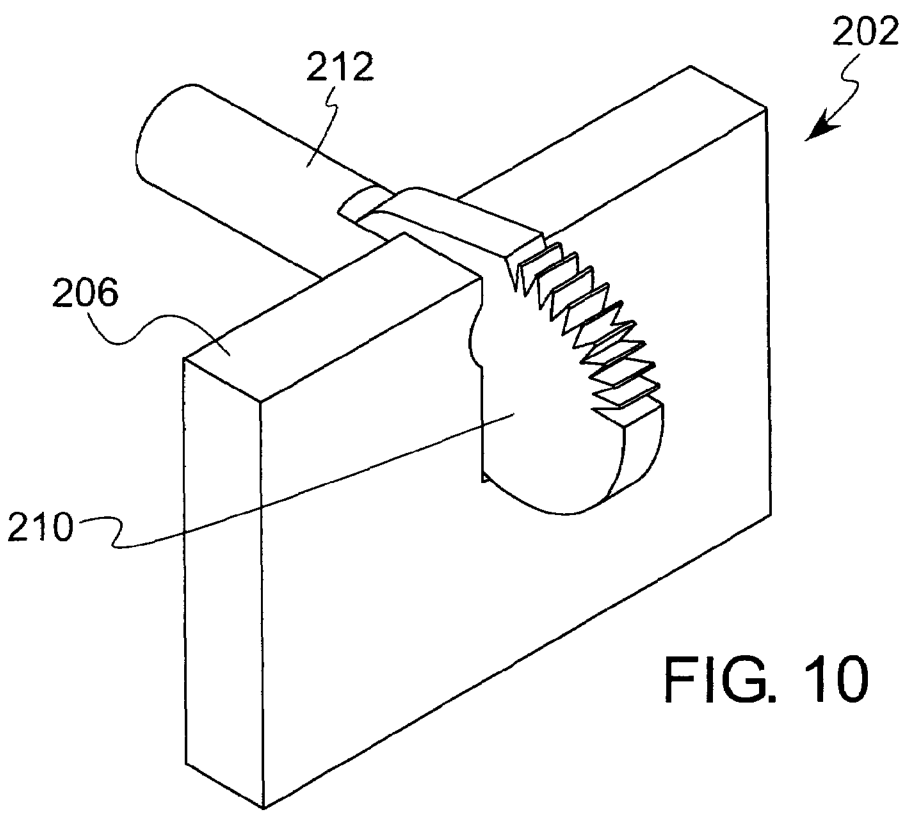
FIG. 10 is a view in perspective illustrating a mechanism for driving a food product in the holder.
Figure 11:
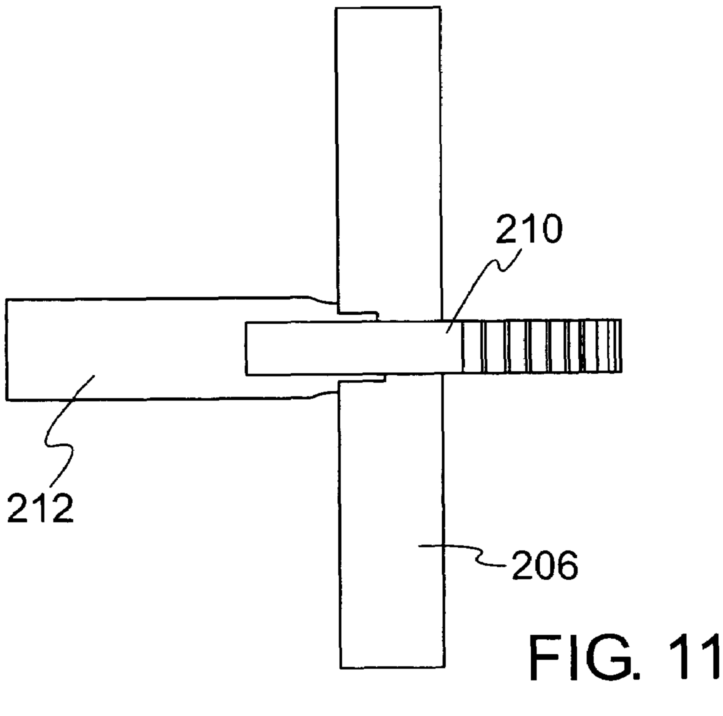
FIG. 11 is a top view illustrating the mechanism of FIG. 10.
Figure 12:
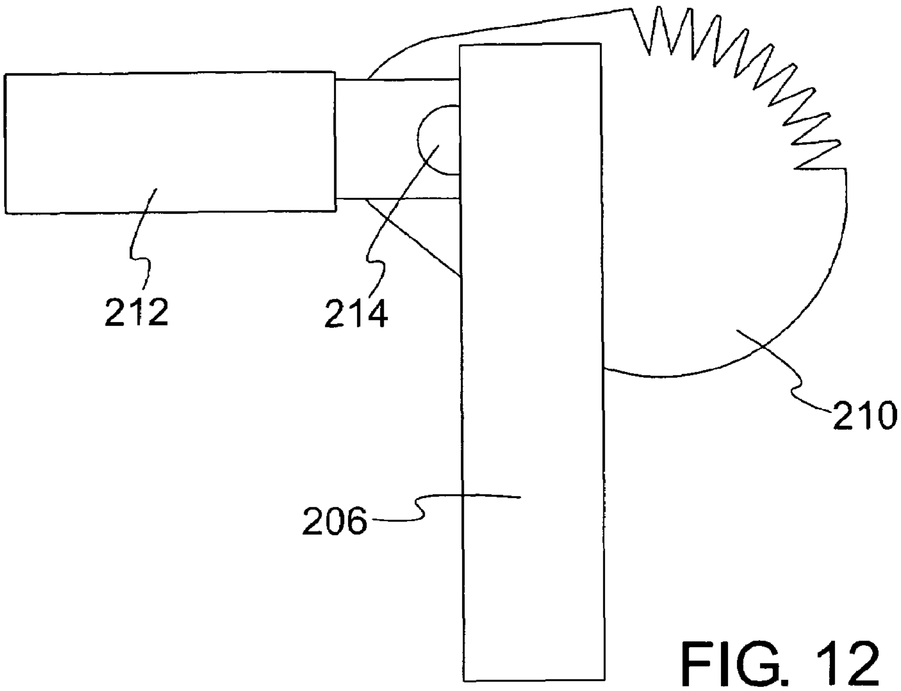
FIG. 12 is a side view illustrating the mechanism of FIG. 10.
Figure 13:
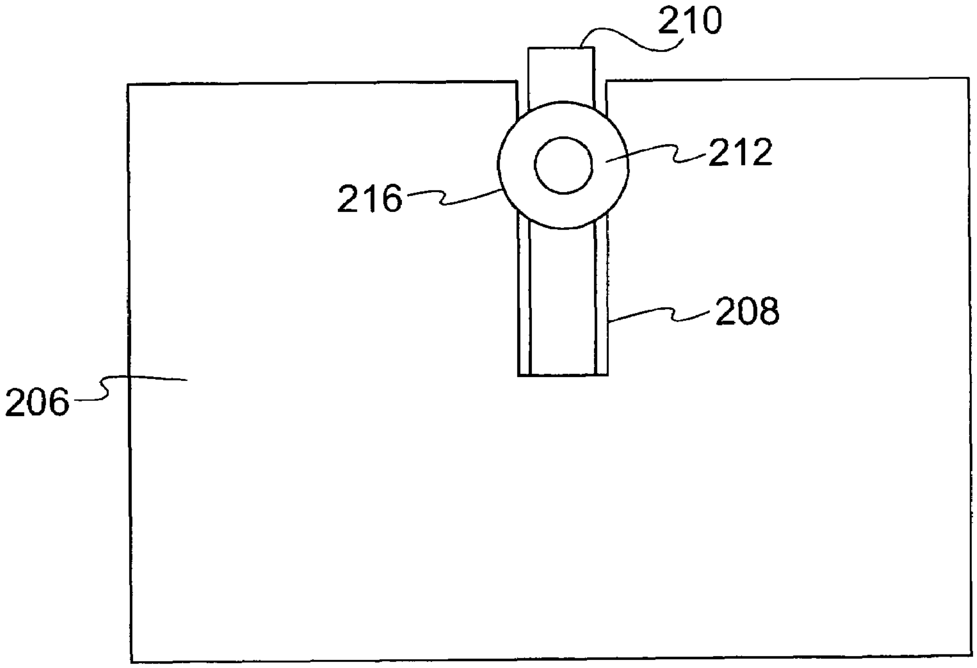
FIG. 13 is an end view illustrating the mechanism of FIG. 10.

In the mechanism 202, a portion of a product holder wall 206 is shown in FIG. 10 with the end of a plunger 212 mounted therein. The plunger 212 extends from a spring that is drivingly linked to a drive rod and driveshaft (not shown) that operate similarly to the drive rod 12 and driveshaft 2 of the FIG. 1 embodiment. The driveshaft drives the drive rod, which applies a force to the spring, which then urges the plunger 212 in reciprocating longitudinal displacement similarly to the plungers 30-36.

The toothed cam 210 mounts in the wall 206 with the plunger 212 pivotably mounted to the cam 210 through the pivot pin 214 (see FIG. 12) extending through the forked legs (see FIG. 11) of the plunger 212 and the end of the cam 210 inserted between the legs of the plunger 212. The slot 208 (see FIG. 13) in the wall 206 permits the cam 210 to move longitudinally as the plunger 212 reciprocates through the cylindrical passage 216 shown in FIG. 13. The teeth of the cam 210 are arranged to be close to the food product in the product holder so that they can seat against and push on the food product, such as a meat log, during at least a portion of the cycle in order to push the food product toward the slicing blade when the clamping apparatus 10 is not clamping the food product.

The timing of the stroke of the plunger 212 is different from the timing of the stroke of the plungers 30-36 of the clamping apparatus 10. This can be accomplished by positioning the end of the drive rod that drives the plunger 212 on the driveshaft at a circumferentially different position than the drive rod 12, or by pivoting linkages that vary the timing of the two apparatuses, or by other mechanisms that will be understood by the person of ordinary skill. In all cases, the plunger 212 is driven longitudinally in the manner of the plungers 30-36 of the FIG. 1 embodiment, which causes the cam 210 to reciprocate into and out of the product holder wall 206, thereby causing the teeth to contact and drive a food product loaded in the barrel of the holder toward the slicing blade.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A product clamping apparatus for a slicing machine having at least one holder with at least first and second opposing sidewalls defining an elongated product-receiving barrel, wherein said first and second sidewalls are fixed relative to one another, said least one holder being cyclically driven by a rotatable driveshaft to displace a product in the holder through a slicing blade during a portion of a holder stroke, the clamping apparatus comprising:

(a) a drive rod having a driveshaft end and a plate end, the driveshaft end drivingly linked to the driveshaft at a position radially offset from the driveshaft's axis of rotation for reciprocatingly driving the drive rod;

(b) a plate pivotably mounted to the holder at a hinge and pivotably mounted to the plate end of the drive rod at a position radially offset from the hinge for being driven by the drive rod about the hinge;

(c) a first plunger disposed at least partially between the plate and the first sidewall and moveable relative to the sidewalls, the first plunger having a product end that extends through an aperture formed in the first sidewall for seating against the product, and thereby clamping the product against the opposing, second sidewall during a portion of the holder stroke in which the plate pivots toward, and simultaneously exerts a force on the plunger in a direction of, the second sidewall; and a spring mounted between the plate and the first plunger.

2. The product clamping apparatus in accordance with claim 1, further comprising a second plunger drivingly linked to the plate above the first plunger, the second plunger having a product end that extends through an aperture in the holder for seating against the product and clamping the product against the holder sidewall at a position longitudinally spaced from the first plunger during a portion of the holder stroke.

3. The product clamping apparatus in accordance with claim 2, further comprising a first spring mounted between the plate and the first plunger and a second spring mounted between the plate and the second plunger.

4. The product clamping apparatus in accordance with claim 1, wherein the spring is preloaded for providing a constant bias to the first plunger.

5. The product clamping apparatus in accordance with claim 1, wherein the spring further comprises a compressible portion on the plunger.

* * * * *